US006952306B1

(12) United States Patent
Anderson

(10) Patent No.: US 6,952,306 B1
(45) Date of Patent: Oct. 4, 2005

(54) OPTICAL CORRELATION DEVICE AND METHOD

(75) Inventor: Betty Lise Anderson, Gahanna, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 10/726,770

(22) Filed: Dec. 2, 2003

Related U.S. Application Data

(60) Provisional application No. 60/430,207, filed on Dec. 2, 2002, provisional application No. 60/430,213, filed on Dec. 2, 2002, provisional application No. 60/430,214, filed on Dec. 2, 2002.

(51) Int. Cl.[7] .................................................. G02B 26/08

(52) U.S. Cl. ...................... 359/298; 359/291; 359/237; 359/246; 359/247

(58) Field of Search ................................ 359/298, 290, 359/291, 223–226, 237, 245, 246, 320, 321, 359/618, 619, 247; 385/16–24

(56) References Cited

U.S. PATENT DOCUMENTS

| | | | | |
|---|---|---|---|---|
| 6,711,316 | B2 * | 3/2004 | Ducellier | 385/17 |
| 6,724,951 | B1 * | 4/2004 | Anderson et al. | 385/15 |

* cited by examiner

*Primary Examiner*—Hung Xuan Dang
*Assistant Examiner*—Tuyen Tra
(74) *Attorney, Agent, or Firm*—Calfee, Halter & Griswold LLP

(57) ABSTRACT

A temporal optical correlator is disclosed. The example optical correlator includes a light source, a set of White cells and a micro-mirror array. The micro-mirror array and set of White cells cooperate to produce a correlated summed output signal. A method for processing signals using the example optical correlator is also disclosed.

13 Claims, 5 Drawing Sheets

OPTICAL CORRELATION DEVICE AND METHOD

CROSS-REFERENCE TO RELATED APPLICATION

This application claims priority to U.S. Provisional Application entitled "Optical Correlation Device and Method," Ser. No. 60/430,207, filed Dec. 2, 2002, which is incorporated herein by reference in its entirety. The present application is further related to contemporaneously filed U.S. Non-Provisional Applications entitled "Method and Apparatus for Combining Optical Beams" and "Method and Apparatus for Monitoring the Quality of Optical Links", based on U.S. Provisional Application Ser. Nos. 60/430,213 filed on Dec. 2, 2002 and Ser. No. 60/430,214 filed on Dec. 2, 2002 respectively, each of which is incorporated herein by reference in its entirety.

TECHNICAL FIELD

The devices, methods and systems described herein relate generally to optical correlation and more particularly to temporal optical correlation.

BACKGROUND

Optical correlators fall into two main categories, spatial correlators, which are well known, and temporal correlators. The present device is a temporal correlator.

A typical prior art correlator 100, also known as a matched filter, adaptive filter, or transversal filter, is depicted in FIG. 1. Correlator 100 includes three elements: a tapped delay line 110, a series of weights $s_k$, generally referred to by reference number 120 and a summer 130. Each tap produces a replica of an input signal with a delay that is some integer multiple of a basic delay increment $\tau$. The weighting elements 110 are a series of phase shifters and/or amplitude changing elements. The summing device 130 is labeled $\Sigma$.

Each of the time-shifted replicas from the tapped delay line is multiplied by a weight, which may be either a phase weight, also known as a complex weight, or an amplitude weight, or a combination. In optical correlation, a processor is said to be coherent if the weights are complex and interference is used to combine the signals. A processor is said to be incoherent if the weights are amplitude-only.

The time-shifted and weighted signals are summed, and this combination of processes produces a correlation. Namely, the input signal is correlated with an arbitrary function that is implemented in the series of weights chosen. The resulting signal is a measure of how similar the incoming signal is to the reference signal encoded in the weights.

Optical correlators have been a topic of interest recently, especially for Optical Code Division Multiple Access ("OCMDA"). These correlators generally consist of a tapped delay line based on optical fiber. Two common prior art optical correlators are illustrated in FIG. 2. A first prior art optical correlator 210 employs a 1×N fiber splitter to generate N copies of an input signal, then each copy of the signal is delayed by a different length of fiber. A second prior art optical correlator 220 employs a series of 2×2 fiber optic splitters combined in various types of lattices. The lattice depicted in FIG. 2 is configured such that at each tap part of the signal takes the short path and part takes the long path, receiving a delay.

In these designs, however, a fiber splitter is required for each tap. Thus it becomes difficult to implement a large number of them. Such an optical correlator has a practical upper limit of about 100 taps, making the maximum practical resolution of such a correlator about 100 samples.

Prior art optical correlators have several disadvantages. One such disadvantage is that each fiber splitter results in some insertion loss. Another disadvantage of prior art optical correlators is that it is difficult to control the splitting ratio of each fiber optic splitter. Further, some type of tuning may be required to keep the amplitudes constant.

Consequently, a need exists for an optical correlator which addresses the disadvantages of the prior art and provides a greater number of taps.

SUMMARY OF THE INVENTION

The following presents a simplified summary of apparatus, systems and methods associated with an optical correlator to facilitate providing a basic understanding of these items. This summary is not an extensive overview and is not intended to identify key or critical elements of the methods, systems, apparatus or to delineate the scope of these items. This summary provides a conceptual introduction in a simplified form as a prelude to the more detailed description that is presented later.

According to a first aspect of the present invention, an apparatus for optically correlating signals is disclosed. The apparatus includes an input light source which is adapted to generate at least one individual light beam from at least one direction. The apparatus also includes a first plurality of optical elements configured to split the at least one individual light beam into a plurality of component light beams. The plurality of optical elements is further configured to direct the plurality of component light beams along a plurality of paths. The apparatus further includes a plurality of White cells. Each White cell is configured to receive at least one component light beam. Each White cell is further configured to propagate light at a specific duration. The apparatus still further includes a micromirror array configured to receive the plurality of component light beams from the plurality of white cells. The micromirror array is further configured to reflect the plurality of component light beams among the plurality of white cells. In addition, the apparatus includes a second plurality of optical elements configured to receive each of the reflected component light beams from the plurality of white cells the plurality of component light beams to form an output light beam.

Certain illustrative example apparatus, systems and methods are described herein in connection with the following description and the annexed drawings. These examples are indicative, however, of but a few of the various ways in which the principles of the apparatus, systems and methods may be employed and thus are intended to be inclusive of equivalents. Other advantages and novel features may become apparent from the following detailed description when considered in conjunction with the drawings.

BRIEF DESCRIPTION OF THE DRAWINGS

Comprehension of the invention is facilitated by reading the following detailed description, in conjunction with the associated drawings, in which.

DETAILED DESCRIPTION

One advantage of performing correlations optically rather than electronically is the increased speed of optical correlation. In an electronic correlator, the taps and delays and controlled by circuits, whose ultimate speed is limited to the fastest existing electronics. To implement delays optically, however, one need only vary the path length. Thus the time between samples can be arbitrarily small. In fact, one can produce hundreds or thousands of optical pulses during a single electronic bit. Note that the weighting and summing are also done optically; thus the entire correlation signal, a calculation involving these thousands of optical pulses, can be produced during a time that is also small compared to electronic switching speeds.

Figure 1:
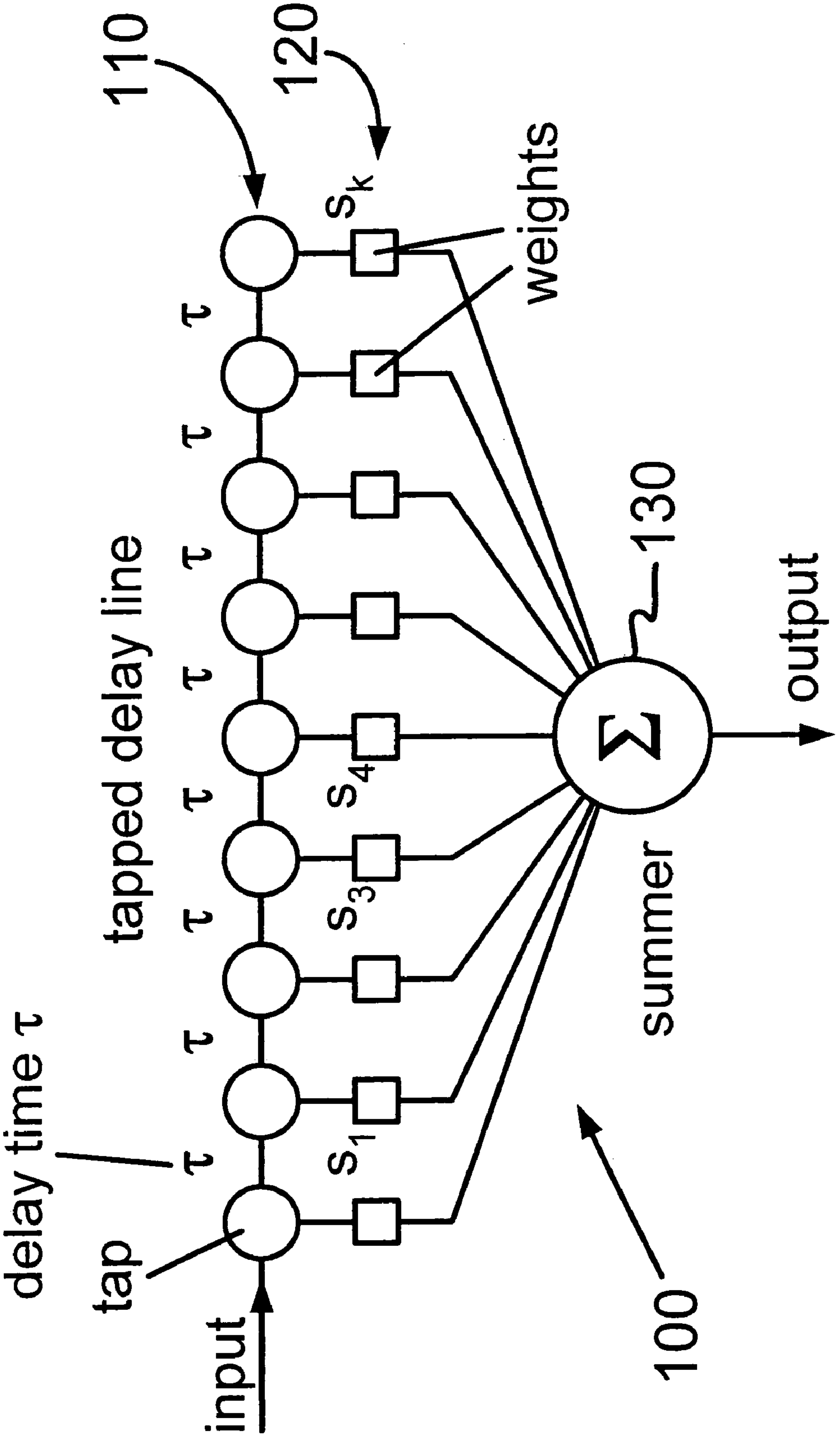
FIG. 1 is a schematic block diagram of a prior art correlator.
Figure 2A:
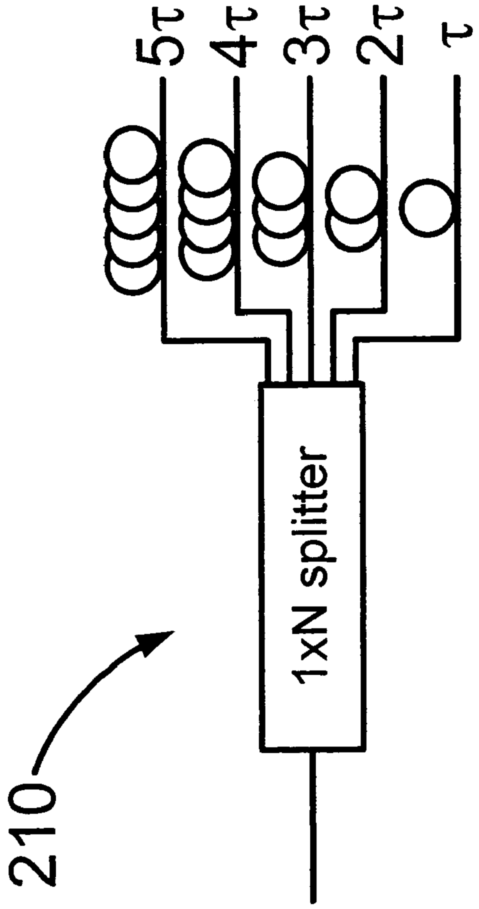
FIGS. 2A–2B are schematic diagrams of two prior art optical correlators.
Figure 2B:
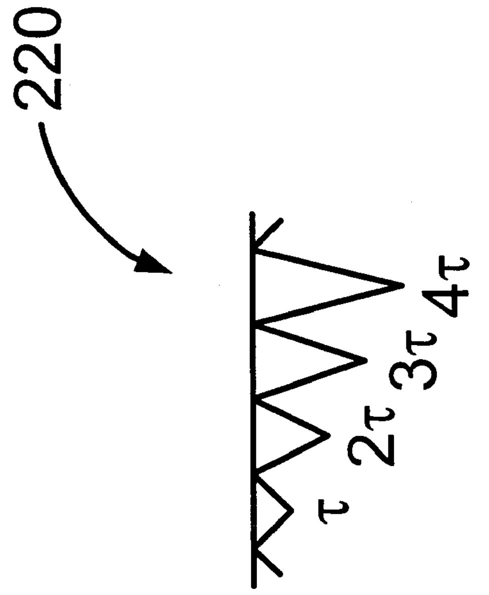

To produce ultra-short time delays using the fiber approaches of prior art optical correlators 210 and 220, however, requires an extremely precise cutting of fibers to appropriate lengths. Such approaches further require cutting very short lengths, and there is a practical limit to how short they can be cut. For example, to produce a delay of 1 ps requires a length of fiber 200 $\mu$m long; about three diameters of a human hair. Thus a tapped delay line (TDL) using the differences between paths, as illustrated in FIG. 2B, will be easier to build than one in which the absolute lengths of the paths determining the delays, as illustrated in FIG. 2A. Even so, the differences must also be kept to within a very tight tolerance. Since in the fiber approach each tap is implemented with different physical piece of hardware, maintaining this kind of accuracy is a technical challenge.

Alternatively, one might implement the tapped delay line in a photonic integrated circuit ("PIC"). In that case, the lengths can be precisely controlled because they are controlled photolithographically. Such an approach has the disadvantage that there is a practical limit to the number of splitters that can fit on a chip. In addition, the PIC cannot support long delays at all since the fiber required for such delays won't fit on the chip.

Figure 3A:
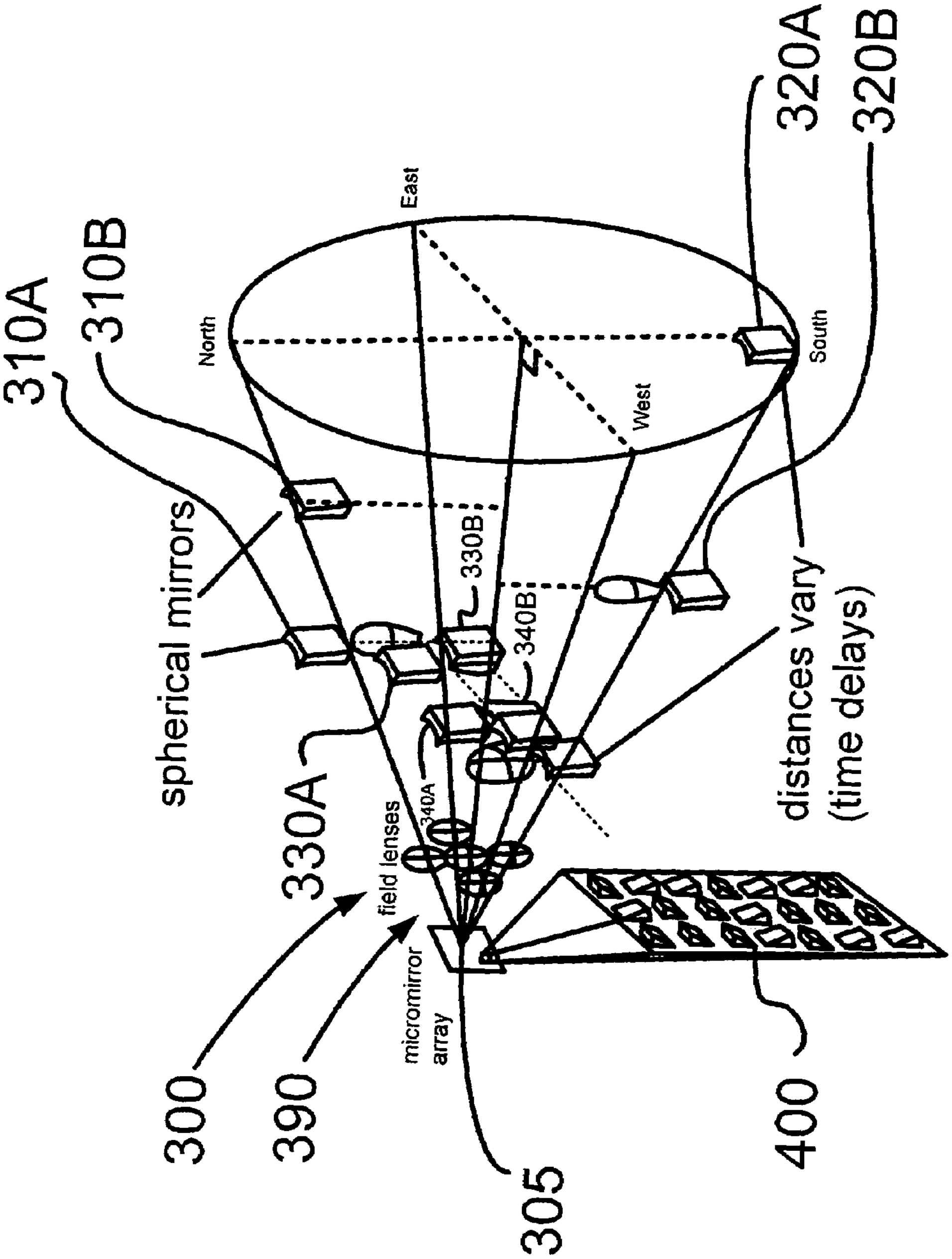
FIG. 3A is a perspective view of an example optical correlator in accordance with the present invention.

Referring now to FIG. 3A, there is illustrated an example embodiment of an optical correlator 300 in accordance with the present invention. Optical correlator 300 employs White cell technology to produce temporal delays. Such White cell technology is a significant improvement over prior art optical correlators in several ways. One advantage is that the same hardware may be re-used to provide successive taps, making accuracy easier to maintain. According to another advantage, thousands of beams can circulate in a White cell at the same time, making it practical to achieve thousands of taps with minimal hardware. A further advantage is that the White cell consists of a few mirrors, so a device according to the present invention is far less hardware intensive that fiber delay lines. Still further, any loss of signal strength will be low compared with prior art techniques.

The present invention employs certain optical true-time delay equipment and techniques which are based on the White cell disclosed in U.S. Pat. No. 6,388,815, which is hereby incorporated by reference in its entirety, to produce the delays.

In the White cell of the '815 patent, one spherical mirror faces the two others. Light beams entering the cell bounce between these three mirrors some fixed number of times, and on each bounce the light is re-imaged to a new spot on one of the mirrors. An important feature is that many beams, hundreds or thousands, can be introduced at the same time, and each traces out a unique, non-overlapping set of spots. As shown in FIG. 300, the mirror of the '815 patent on which the spots fall is replaced with a fixed array of tiny mirrors 400, each of which is permanently tipped in an appropriate direction. Using this micromirror array 400, beams can be reflected to White cells of different lengths, incurring a time delay relative to the other beams.

Optical correlator 300 includes a light source 305 which generates a beam of light. The example optical correlator 300 also includes five White cells which are configured to receive/provide light beams from/to the common micromirror array 400. The beam of light passes through field lenses 390, and is directed to one of the White cells. The five White cells include pairs of spherical mirrors disposed along the axes labeled North, South, East, West and Up. Mirrors 310A and 310B, for example, are disposed along the North axis; Mirrors 320A and 320B are disposed along the South Axis; and mirrors 330A and 330B are disposed along the East axis. In the tapped delay line, the first beam will receive a relative delay of 0τ, the second beam a delay of 1τ, the third beam a delay of 2τ, and so on. Over six thousand different delays can be obtained in just 18 bounces by appropriate combination of the White cells.

Figure 3B:
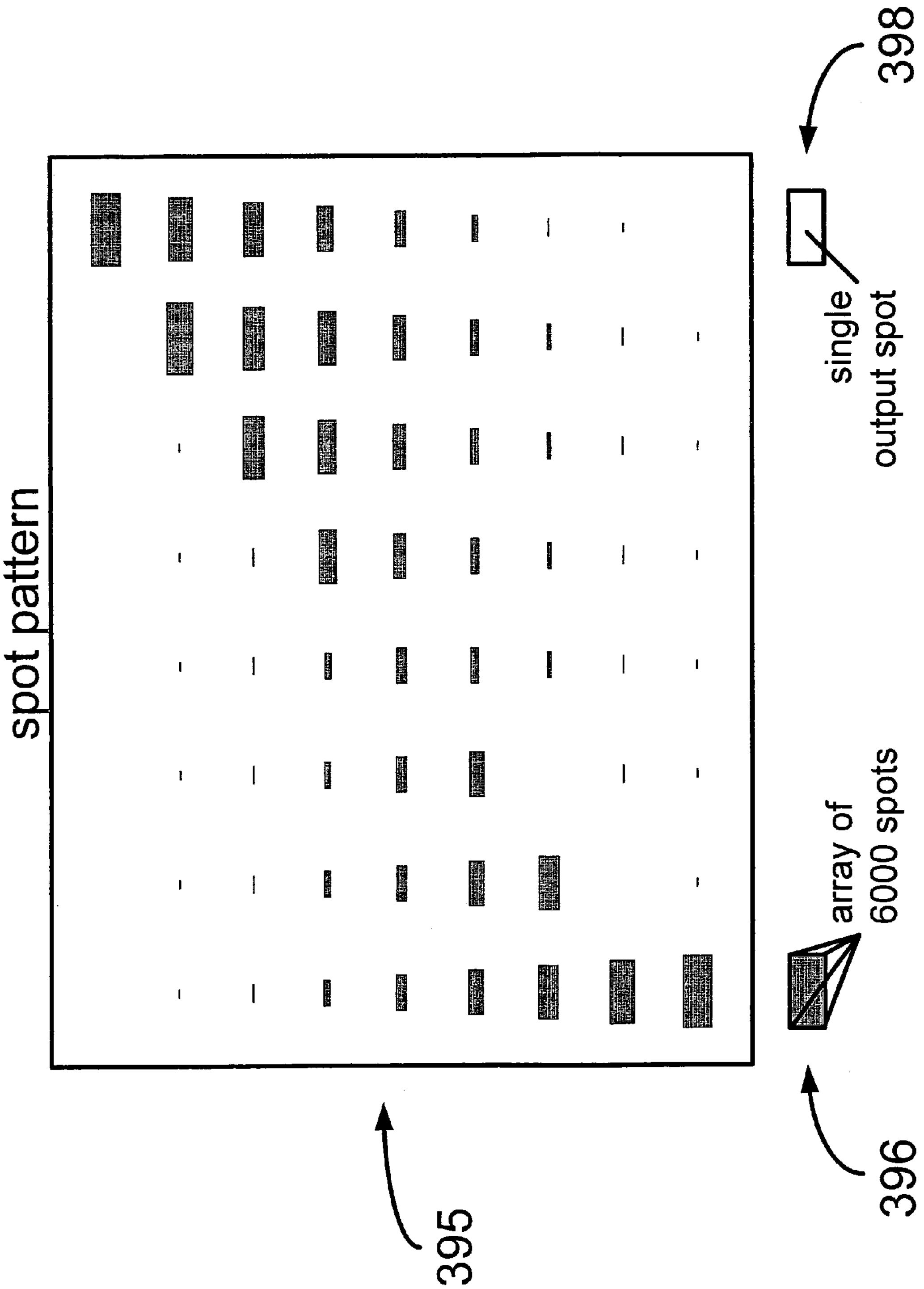
FIG. 3B is an example spot pattern generated by the optical correlator of FIG. 3A.

An example spot pattern 395 generated by optical correlator 300 along the top of the micromirror array 400 is shown in FIG. 3B. The pattern of 6000 spots is depicted at 396. The spots of the spot pattern are then summed to create a single output spot 398.

Along the Up axis, there are two spherical mirrors 340A and 340B that are the same distance from the micro-mirror array, and they form a White cell. This White cell is also known as the null cell. Light that bounces back and forth only to these mirrors will have an overall propagation time through the device T. Suppose, however, that a second beam is sent to a longer arm, such as along the South axis, to a spherical mirror that is slightly further from the micro-mirror array, one time, but remains in the null cell the rest of the time. It takes slightly longer to emerge; it has a total propagation time T+τ, where r is the time increment induced by the displaced mirror. Thus this beam is delayed by r relative to the other. By combining different numbers of visits to spherical mirrors at various distances from the micro-mirror array 400, a wide variety of time delays can be obtained.

Figure 4:
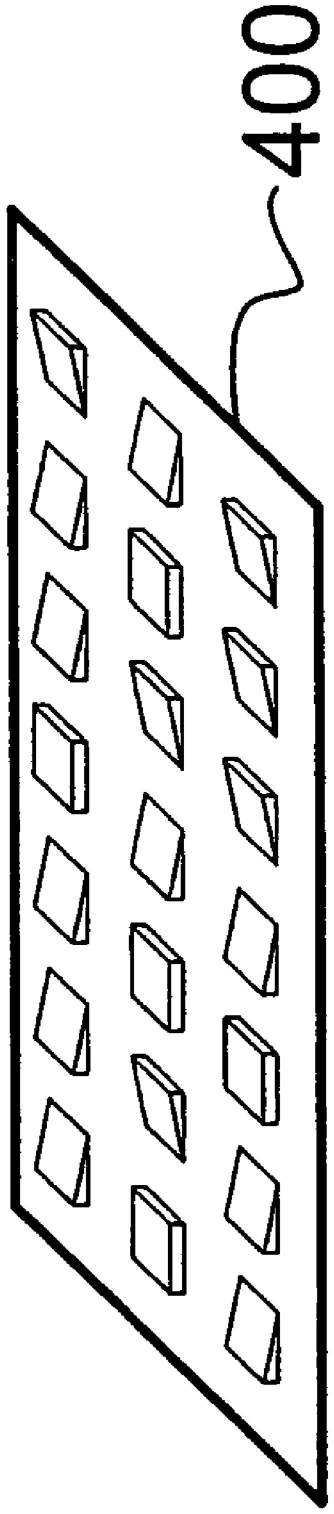
FIG. 4 is a perspective view of an example fixed micro-mirror array of the optical correlator of FIG. 3A.

The present invention employs this technique to produce a tapped delay line. The input beam is split into multiple beams, for example using conventional techniques such as a 1×N fiber splitter or a set of optical elements such as field lenses 390, before entering a White cell; thus all taps have equal power. In the time delay device of the '815 patent, the time delays were programmable and a spatial light modulator, such as a liquid crystal or a micro-electro-mechanical ("MEM") device, was used to switch each light beam among the paths of different lengths. In the present application, each input beam is associated with a fixed, known delay: the first beam gets a delay of 0τ, the second beam a delay of 1τ, the third gets 2τ, etc. Thus for a fixed tapped delay line the MEM can be replaced with a fixed micromirror array 400, such as that shown in FIG. 4. As illustrated, each micromirror in the array 400 is tipped to a predetermined angle. Although the array 400 employs three different mirror orientations, more are possible. Each light beam makes a fixed number of bounces in the White cell, and on each bounce strikes a particular micromirror, which determines the path and thus the delay. Any of the time delay variations previously disclosed in the '815 or '176 patents may be used, such quadratic cell, binary cell, higher-order cells, for example.

The output of the tapped delay line is thus N replicas of the incoming signal, each delayed by a different amount.

Implementation of the Weights

Programmable phase weights can be implemented using any type of optical phase-shifter, such as using electro-optic materials like liquid crystals or lithium niobate. Amplitude weights can be implemented using any of the conventional methods, such as a Mach-Zehnder interferometer, or electro-absorption modulators.

Implementation of the Summer

The optical signals can be summed by causing all the outputs to be incident on a single detector or fiber. If the signals are to be converted directly to an electronic signal, then a lens or other imaging device can divert all the outputs to a common area on the detector. However, it is more advantageous to keep the signal in the optical domain, for example if the correlator has just been used to place a optical code-division multiplexing (CDMA) code on the beam, and the beam is to be transmitted across a fiber optic network.

A single lens is not sufficient to condense the output signals, since the resulting image would not be a single spot, but a greatly shrunk array of spots. Such an array of spots would not couple efficiently into a single mode fiber, even if it could be produced with violating the diffraction limit. Rather, each output beam should maintain its size but be superposed with the others. For this, we can use the optical interconnection device also based on the White cell described in U.S. Pat. No. 6,266,176 which is hereby incorporated by reference in its entirety.

Briefly, the interconnection device of the '176 patent is similar to the time delay device of '815. A series of White cells are constructed again, but for interconnection, the distances to the spherical mirrors from the micro-mirror array are identical to provide constant latency. Each spherical mirror, however, has a slightly different tilt, producing a slightly different location for its center of curvature. The result is that the beam sent to a tilted mirror returns to the micro-mirror array in a different row or column of pixels than it would have had it remained in the null cell. Thus this beam exits the device in a different location, depending on the number of visits to these tilted to mirrors.

The interconnection device, like the time delay device, was originally designed to be programmable. In the correlator, however, every spot being input into the summer needs to be directed to the same output, and since this switching pattern is fixed, we again don't require a MEM but just a micromirror array or other passive optical device that directs beams in given directions.

Combining Delay Elements and Summer

As described, a set of White cells can be employed to provide delays, each input beam receiving a delay longer than the next by the time increment $\tau$. This is achieved by placing the various White cell mirrors (the spherical mirrors) at different distances from the mirocmirror array 400. Further, a set of White cells can be employed to produce shifts in the spot pattern, each input being shifted by one pixel more than the next.

The present invention combines these functions. Consider a series of input beams. Let the first one strike a set of micromirrors that direct this beam on every bounce to the null cell. It emerges at a certain output location with no net delay. Suppose the second beam is directed to the null cell on every bounce except one, and that on that bounce it goes to another spherical mirror. Let that White cell mirror be placed at a distance from the micro-mirror array so as to produce a delay $\tau$. Further, let that same spherical mirror also have center of curvature placed so as to displace the spot pattern by one row or column. Thus the second input beam that is sent to this spherical mirror one time will be delayed by one increment and shifted by one increment. Its output beam thus is superposed with that of the first beam. The third input beam is sent to this mirror twice, such that it is delayed by two increments and shifted by two, also landing at the same output location as the other two. Each of the spherical mirrors is placed so as to provide a specific delay as outlined in previous disclosures, and each mirror is also tilted to as to provide a comparable shift in spot pattern.

The optical correlator (or matched filter) can produce thousands of sample points, because many beams can circulate in a White cell without interfering with one another. The number of beams is limited only by the number of micro-mirrors one is willing to make. By making the mirrors small, for example on the order of 50–100 $\mu$m, a very large array having hundreds of thousands of mirrors can be made on a chip the size of a typical integrated circuit.

The particular design shown in FIG. 3 requires ten spherical mirrors and one fixed micromirror array. It can produce 6550 thousand taps for a 6550 beams. More taps can be achieved readily with more bounces.

The mirrors are all expected to have dielectric high-reflectivity coatings and thus the total loss (excluding output coupling loss) will be less than about 0.5 dB. This includes the loss from the spherical mirrors' and the lenses' coatings.

Very short delays can be produced by making the differences between the mirrors distances very small. Alternatively, one can place dielectrics of differing thicknesses in the various arms to produce the desired delays. Because the delays are obtained by repeated visits to the same mirrors, only a handful of paths must be carefully tuned, as opposed to one fiber path for each tap as in the fiber approaches.

The present invention is an optical correlator or matched filter based on the White cell. It advantageously produces thousands of taps for ultra-high resolution in optical signal processing. It also combines the tapped delay line with the summing function in a single device.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An apparatus for optically correlating signals, comprising:

an input light source, the input light source adapted to generate at least one individual light beam from at least one direction;

a first plurality of optical elements configured to split the at least one individual light beam into a plurality of component light beams, the plurality of optical elements further configured to direct the plurality of component light beams along a plurality of paths;

a plurality of white cells, each white cell configured to receive at least one component light beam, each white cell further configured to propagate light at a specific duration;

a micromirror array configured to receive the plurality of component light beams from the plurality of white cells, the micromirror array further configured to reflect the plurality of component light beams among the plurality of white cells;

a second plurality of optical elements configured to receive each the reflected component light beams from the plurality of white cells the plurality of component light beams to form an output light beam.

2. The apparatus of claim 1, wherein each component light beam of an individual light beam has equal power.

3. The apparatus of claim 1, wherein the first plurality of optical elements is a plurality of lenses.

4. The apparatus of claim 1, wherein the plurality of white cells includes a null cell.

5. The apparatus of claim 1, wherein the micromirror array is a micro-electro-mechanical device.

6. The apparatus of claim 1, wherein the micromirror array is an array of mirrors, each mirror disposed at a fixed angle.

7. The apparatus of claim 1, wherein the second plurality of optical elements includes a second plurality of white cells.

8. An apparatus for optically correlating signals, comprising:

an input light source, the input light source adapted to generate an input light beam;

a first plurality of optical elements configured to split the input light beam into a plurality of component light beams, each of the component light beams being a replica of the input light beam and each of the component light beams having a power less than the input light beam, further the plurality of optical elements further configured to direct each of the plurality of component light beams along a distinct path;

a plurality of white cells, each white cell configured to receive at least one component light beam, each white cell further configured to propagate light at a unique duration;

a micromirror array configured to receive the plurality of component light beams from the plurality of white cells, the micromirror array further configured to reflect the plurality of component light beams among the plurality of white cells; and a second plurality of optical elements configured to receive each of the reflected component beams from the plurality of whitecells the plurality of component light beams to form an output light beam.

9. The apparatus of claim 8, wherein each component light beam of an individual light beam has equal power.

10. The apparatus of claim 8, wherein the plurality of white cells includes a null cell.

11. The apparatus of claim 8, wherein the micromirror array is a micro-electro-mechanical device.

12. The apparatus of claim 8, wherein the micromirror array is an array of mirrors, each mirror disposed at a fixed angle.

13. The apparatus of claim 8, wherein the second plurality of optical elements includes a second plurality of white cells.

* * * * *